W. R. ORMANDY & J. W. SPENSLEY.
MANUFACTURE OF DETERGENTS.
APPLICATION FILED MAR. 9, 1912.
1,036,316.
Patented Aug. 20, 1912.
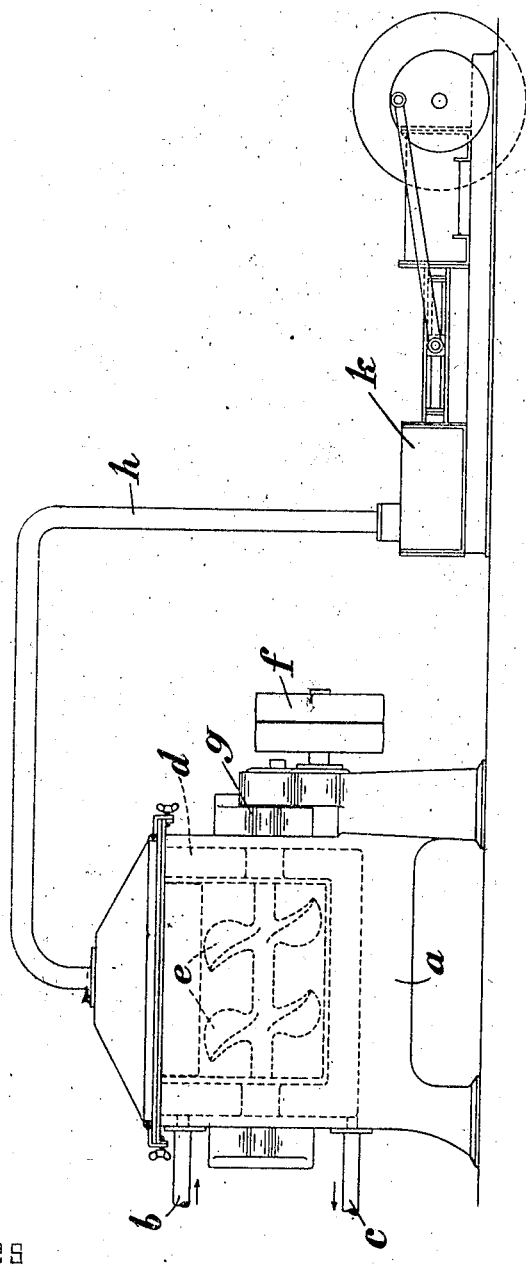
Witnesses
Inventors
William R. Ormandy
Jacob W. Spensley

UNITED STATES PATENT OFFICE.

WILLIAM REGINALD ORMANDY AND JACOB WILLIAM SPENSLEY, OF MANCHESTER, ENGLAND.

MANUFACTURE OF DETERGENTS.

1,036,316.  Specification of Letters Patent.  Patented Aug. 20, 1912.

Application filed March 9, 1912. Serial No. 682,672.

*To all whom it may concern:*

Be it known that we, WILLIAM REGINALD ORMANDY and JACOB WILLIAM SPENSLEY, subjects of the King of Great Britain, both residing at Manchester, in the county of Lancaster, in the Kingdom of England, have invented certain new and useful Improvements Relating to the Manufacture of Detergents, of which the following is a specification.

This invention relates to the manufacture of washing compositions or detergents.

It is the object of the invention to produce a washing composition which can be sold in a finely divided form and which will have practically no tendency to cake or solidify when kept for some time before use, in paper bags for instance.

The invention relates particularly to the manufacture of finely divided washing sodas which may consist either of carbonate of soda alone or more usually of mixtures of carbonate with silicate of soda, or with other detergent substances of a similar character.

We have found experimentally that such washing sodas as hitherto made contain mixtures of carbonates with various amounts of water of crystallization, and it is mainly the subsequent exchange of water from the carbonate with most water to the carbonate with lesser amounts of water of crystallization, and the consequent growth of fresh crystals, which causes the binding together of the mass into a hard cake or lump.

The present invention is based on the discovery that if finely divided washing soda containing the mixed carbonates be heated to a certain temperature and stirred or agitated continuously, the exchange of water of crystallization can be caused to take place rapidly, producing a washing soda containing carbonate which is practically all uniformly hydrated. The temperature in question is that at which the washing soda just begins to soften, and it must not be so high that the mixture changes into a liquid form. The action which takes place may be explained as follows:—If a solution of sodium carbonate in warm water be cooled down, it is found that there is a range of temperatures between about 34 degrees and 30 degrees centigrade within which the carbonate crystallizes out with 7 molecules of water of crystallization ($Na_2CO_3 7H_2O$). Below the temperature of 30 degrees however the carbonate which crystallizes out from a solution or mixture with water is the decahydrated carbonates ($Na_2CO_3 10H_2O$). The critical temperature below which the decahydrated carbonate forms is lower than 30 degrees when other substances such as silicate of soda are present in the mixture, and for instance if silicate of soda solution of 1.2 specific gravity, be mixed with an equal amount by weight of anhydrous carbonate of soda, (so that the mixture contains about 19 parts by weight of silicate of soda to 100 parts of carbonate and 100 parts of water), the critical temperature below which the decahydrated carbonate begins to form is about 28 degrees centigrade, instead of 30 degrees as stated above for the carbonate mixed with water alone. It may be even lower when a larger proportion of silicate is present. The washing sodas usually made contain sodium carbonate mainly in the form of the decahydrated and the monohydrated carbonates. The object of the heating according to the present invention is to produce a practically uniformly hydrated carbonate as already stated. If the mixture were heated sufficiently to turn it into a liquid it would be necessary to continue the heating for some time to make the whole mass liquid at a temperature above the range already referred to and then to allow crystallization to take place within this range. If however the mixture be heated until it just begins to soften, a little below the critical temperature for the formation of the decahydrated carbonate above referred to, the whole of the highly hydrated carbonate is brought into a condition in which it is very ready to give up some of its water, that is to say its vapor tension is very high. The vapor tension of the monohydrated carbonate present is still very low. Consequently the water from the decahydrated carbonate is readily transferred to the monohydrated carbonate present, while the whole mixture is kept well stirred or agitated at the desired temperature. There is no necessity to determine accurately in advance the critical temperature for the formation of the decahydrated carbonate, but the mixture of materials can be heated as before mentioned until the crystals begin to soften and this determines the temperature which must not be exceeded if the desired action is to take place. The operation is preferably carried out in a closed vessel so that the water vapor will not escape, and the vessel must be fitted with a stirring apparatus to keep the mixture well agitated and to prevent new crystals from growing so as to bind the particles together. The resulting product will generally contain the whole of the carbonate in the condition of penta-, hexa- or hepta-hydrated carbonate according to the amount of water originally present in the mixture. If there is insufficient water present some may be added, preferably in the form of more hexa-hydrated carbonate, and if too much water is present some may be removed by carrying out the operation for instance in an apparatus connected to a suction plant as described hereinafter, so as to evaporate some of the water. The resulting carbonates with the amounts of water of crystallization above mentioned, do not tend to give up or absorb water to any appreciable extent, and the resulting mixture therefore has practically no tendency to cake or solidify.

The operation above referred to may be conveniently carried into effect in a mixing apparatus of the type shown in the drawings. In this apparatus $a$ represents the frame, $b$ is a water inlet and $c$ a water outlet communicating with a water-jacket $d$. Water heated to any desired temperature may be thus supplied to the jacket $d$ in order to keep the substances inside the apparatus at any desired temperature. The mixing blades $e$ indicated in dotted lines are on a shaft or shafts driven from a pulley $f$ through gearing $g$. A pipe $h$ leading from the top of the apparatus may communicate with a vacuum pump $k$ which may be used to draw off some of the water vapor from the mixture as stated if rather too much water is present in the mixture. Of course any other convenient form of mixing apparatus could be used for the purpose, and the apparatus illustrated is intended to serve as an example only.

It will be clearly understood that the process according to the present invention is applicable for use in producing finely divided washing sodas which will not tend to cake from washing sodas already produced but which have become caked, or are in a condition to become caked, the caked masses being broken up if required before the mixture is subjected to the process according to this invention. The process may obviously be applied also to the treatment of mixtures constituting washing sodas directly they are produced by crystallization from a solution.

We declare that what we claim is:—

1. A process for manufacturing washing soda in a finely divided form, consisting in heating a detergent mixture containing finely divided carbonate of soda with various amounts of water of crystallization, to a temperature just below the critical temperature at which the decahydrated carbonate begins to form from a solution containing the same materials which is being cooled down from a higher temperature, stirring the mixture while maintaining it at the said temperature just below the critical temperature mentioned until the water of crystallization has become transferred from the more highly hydrated carbonate to that with less water of crystallization, whereby a mixture is produced of carbonate with an intermediate amount of water of crystallization, which mixture will be stable for practical purposes and will not tend to cake.

2. A process for manufacturing washing soda in a finely divided form, consisting in heating a detergent mixture containing carbonate of soda with various amounts of water of crystallization, stirring the mixture while it is heated, and maintaining the temperature at a point such that the material just begins to soften, but does not actually liquefy, whereby the vapor tension of the carbonate with the highest amount of water of crystallization is greatly increased, and a transfer of water is caused to take place until a practically uniformly hydrated carbonate with an intermediate amount of water of crystallization is produced.

3. A process for manufacturing washing soda in a finely divided form, consisting in stirring a mixture of silicate and carbonate of soda in the form of crystals with various amounts of water of crystallization, the stirring being continued at a temperature just below that at which the mixture begins to become liquid, until the water of crystallization has been exchanged from the more highly hydrated to the less highly hydrated carbonate, and a mixture is produced containing the carbonate with approximately uniform amounts of water of crystallization.

4. A method of making a finely divided washing soda which will have practically no tendency to cake, by using a washing soda of a consistency such that it tends to become caked when kept, the process consisting in stirring a detergent mixture containing finely divided washing soda in a form which tends to cake, and maintaining the temperature of the mixture at a point such that the mixture just begins to soften without actually liquefying, until the resulting mixture contains carbonate of soda in a condition in which it is all crystallized with from 5 to 7 molecules of water of crystallization.

In witness whereof, we have hereunto signed our names this 26th day of February 1912, in the presence of two subscribing witnesses.

WILLIAM REGINALD ORMANDY.
JACOB WILLIAM SPENSLEY.

Witnesses:
RICHD. L. CLEAVER,
HUBERT A. GILL.